(12) United States Patent
Goergen

(10) Patent No.: US 12,567,516 B2
(45) Date of Patent: Mar. 3, 2026

(54) LIGHTWEIGHT AND DURABLE CABLE

(71) Applicant: Universal City Studios LLC, Universal City, CA (US)

(72) Inventor: Patrick John Goergen, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 267 days.

(21) Appl. No.: 18/198,196

(22) Filed: May 16, 2023

(65) Prior Publication Data

US 2023/0386701 A1 Nov. 30, 2023

Related U.S. Application Data

(60) Provisional application No. 63/347,411, filed on May 31, 2022.

(51) Int. Cl.
| | |
|---|---|
| *H01B 7/18* | (2006.01) |
| *A63G 31/02* | (2006.01) |
| *G02B 27/01* | (2006.01) |
| *G06F 1/16* | (2006.01) |
| *H01B 7/04* | (2006.01) |

(52) U.S. Cl.
CPC ........... *H01B 7/1875* (2013.01); *A63G 31/02* (2013.01); *G02B 27/0176* (2013.01); *G06F 1/163* (2013.01); *G02B 2027/0169* (2013.01)

(58) Field of Classification Search
CPC ...... H01B 7/0045; H01B 7/185; H01B 7/043; H01B 7/1875
See application file for complete search history.

(56) References Cited

U.S. PATENT DOCUMENTS

| | | | |
|---|---|---|---|
| 4,095,042 A | 6/1978 | Ross | |
| 4,229,615 A | 10/1980 | Orr, Jr. et al. | |
| 5,773,762 A | 6/1998 | Orr, Jr. et al. | |
| 6,173,101 B1 * | 1/2001 | Bourghelle | H01B 7/0892 |
| | | | 385/115 |
| 6,500,541 B1 | 12/2002 | Schoeck, Jr. et al. | |
| 8,500,489 B2 | 8/2013 | Lu et al. | |
| 8,772,636 B2 * | 7/2014 | Yamaguchi | H02G 3/0487 |
| | | | 174/72 A |
| 9,036,973 B2 | 5/2015 | Hsing | |

(Continued)

FOREIGN PATENT DOCUMENTS

JP 2018101627 A 6/2018

OTHER PUBLICATIONS

PCT/US2023/023893 International Search Report and Written Opinion mailed Sep. 12, 2023.

(Continued)

*Primary Examiner* — Timothy J Thompson
*Assistant Examiner* — Amol H Patel
(74) *Attorney, Agent, or Firm* — Fletcher Yoder, P.C.

(57) ABSTRACT

A cable includes multiple internal cables configured to transmit electrical signals, an outer jacket that houses the internal cables, and round portions formed proximate to opposite end regions of the cable, wherein the internal cables are arranged to circumferentially surround a center axis in the round portions. In addition, the cable includes a flat portion positioned between the round portions of the cable, wherein the internal cables are arranged in a row across the flat portion.

20 Claims, 6 Drawing Sheets

(56) References Cited

U.S. PATENT DOCUMENTS

| | | | |
|---|---|---|---|
| 9,455,072 B2 | 9/2016 | Tatsumi et al. | |
| 9,509,099 B2 | 11/2016 | Di et al. | |
| 10,288,501 B2 | 5/2019 | Homsy et al. | |
| 2002/0117324 A1 | 8/2002 | Wang | |
| 2008/0035367 A1 | 2/2008 | Tanaka et al. | |
| 2012/0121120 A1 | 5/2012 | Gorzelany | |
| 2013/0248038 A1 | 9/2013 | Aoyama et al. | |
| 2013/0269972 A1* | 10/2013 | Aoyama | H01B 7/16 |
| | | | 174/102 R |
| 2014/0326479 A1* | 11/2014 | Itani | H02G 3/04 |
| | | | 72/367.1 |
| 2016/0176369 A1* | 6/2016 | Ito | H01B 9/006 |
| | | | 174/72 A |
| 2020/0113497 A1 | 4/2020 | Triman et al. | |
| 2020/0286647 A1* | 9/2020 | Hayakawa | H01B 9/003 |
| 2020/0383221 A1 | 12/2020 | Graham et al. | |
| 2021/0035708 A1 | 2/2021 | Oro et al. | |
| 2021/0197741 A1* | 7/2021 | Goto | H01B 13/0006 |
| 2023/0012683 A1* | 1/2023 | Cevallos | B60R 16/0215 |
| 2023/0142348 A1* | 5/2023 | Campen | F16L 3/23 |
| | | | 138/106 |

OTHER PUBLICATIONS

Tanner Tech, "How to Repair Broken Lightning Cable With Heat Shrink Tubing," Jul. 11, 2017, pp. 1-2, YouTube, https://www.youtube.com/watch?v=RQTGJ_cegb8.

* cited by examiner

LIGHTWEIGHT AND DURABLE CABLE

CROSS-REFERENCE TO RELATED APPLICATION

This application claims priority to and the benefit of U.S. Provisional Application No. 63/347,411, entitled "A LIGHT-WEIGHT AND DURABLE CABLE" and filed May 31, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks contain a variety of attractions that provide unique experiences to guests. These attractions may include rides, immersive experiences, or guest facing areas (e.g., kiosks). In certain attractions, the guests may utilize an accessory (e.g., headset, handheld device, or wearable device) coupled, via a cable, to a component of the attraction. Due to repeated use in a high motion environment, the cable may sustain damage causing the cable to malfunction and/or wear quickly over time. Damage to the cable may prevent the accessory from operating properly, thereby hindering a guest experience at the attraction. The cable may need to be replaced frequently to avoid the damage to the cable, thereby resulting in high costs and/or maintenance time. Thus, it is presently recognized that it may be desirable to provide a lightweight, durable cable that can withstand heavy use in the high motion environments of attractions in amusement parks.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a cable includes multiple internal cables configured to transmit electrical signals, an outer jacket that houses the internal cables, and round portions formed proximate to opposite end regions of the cable, wherein the internal cables are arranged to circumferentially surround a center axis in the round portions. In addition, the cable includes a flat portion positioned between the round portions of the cable, wherein the internal cables are arranged in a row across the flat portion.

In an embodiment, a system for an amusement attraction includes an accessory that is worn or held by a guest as well as a cable that connects the accessory to a component. The cable includes multiple internal cables surrounded by an outer jacket, round portions formed proximate to opposite end regions of the cable, as well as a flat portion positioned between the round portions of the cable.

In an embodiment, a cable includes an outer jacket comprising heat shrink fabric as well as one or more internal cables. The internal cables include one or more conductors, padding surrounding the one or more conductors to form one or more padded conductors, shielding surrounding the one or more padded conductors, filler wrapped around the one or more padded conductors and an inner jacket surrounding the one or more padded conductors, the shield, and the filler. The inner jacket includes plastic, polyvinyl chloride (PVC), another insulative material, or any combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
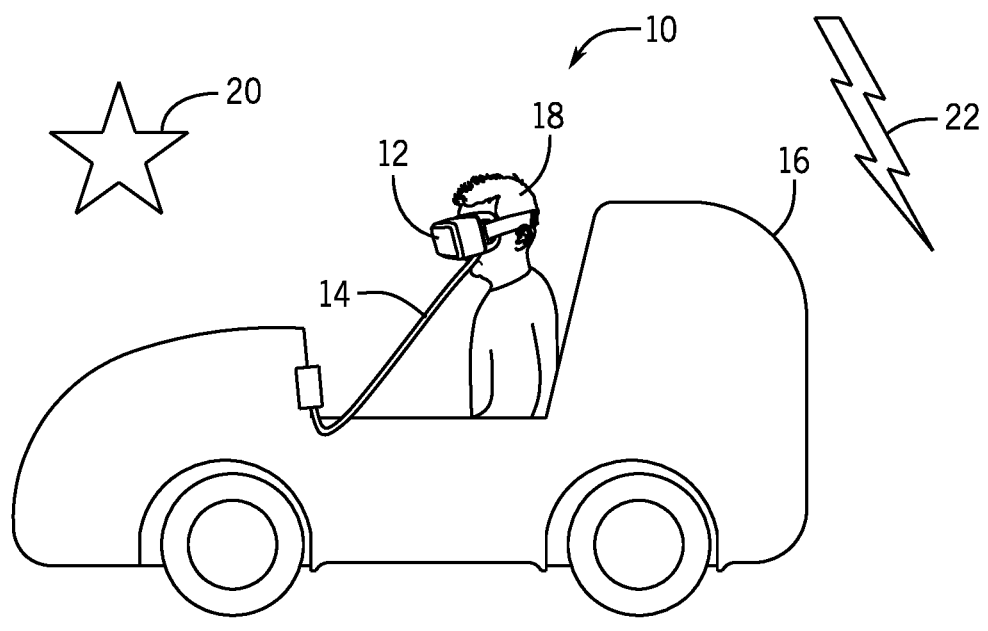
FIG. 1 is a schematic diagram of an amusement attraction that includes an accessory, coupled via a cable, to a component of the amusement attraction, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numerical terms, such as "first," "second," and "third" may be used to distinguish components to facilitate discussion, and it should be noted that the numerical terms may be used differently or assigned to different elements in the claims. Furthermore, certain numbers (e.g., 90 degrees; 180 degrees) and/or dimensions (e.g., parallel; perpendicular) are used to facilitate discussion and are intended to include variations (e.g., to account for tolerances, such as manufacturing tolerances).

Amusement parks feature a wide variety of amusement attractions (e.g., entertainment activities), such as amusement park rides, performance shows, and immersive experiences. Certain amusement attractions may involve a guest or amusement park staff holding or wearing an accessory (e.g., a headset, a wearable or handheld device) that is connected (e.g., electrically coupled, communicatively coupled), via a cable, to a component of the amusement attraction. For example, during an amusement park ride, a guest may wear an augmented reality (AR), virtual reality (VR), and/or mixed reality (AR and VR) headset that is connected, via a cable, to a ride vehicle.

It may be appreciated that the amusement attractions may frequently involve placing the accessories, as well as their respective cables, in high motion environments, such as roller coaster rides. Repeated use in high motion environments may subject the cables to rapid movement and strong forces, which may quickly lead to cable damage and/or cause the cables to malfunction. Embodiments of the present disclosure are directed to a lightweight and durable cable that is designed to withstand repeated use in high motion environments. In particular, the cable may enable transmission of electrical signals (e.g., data, control signals, power) between an accessory, such as a headset (e.g., AR/VR headset, which may include an AR, VR, and/or mixed reality headset) or an interactive device (e.g., blaster, baton, crossbow), and a component of the amusement attraction.

The lightweight and durable cable of the present disclosure may withstand approximately or more than 150,000 testing cycles (e.g., cycles of bending and twisting of the cable performed by a test apparatus), which is significantly more than the number of testing cycles withstood by existing cables (e.g., cables in use with accessories or in similar settings in amusement parks; cables not specifically designed for durability in amusement parks). For example, existing cables previously used in amusement attractions in amusement parks withstand approximately 80 to 800 testing cycles. Thus, the cable of the present disclosure includes a unique, specific combination of features arranged in a unique, specific manner such that the cable yields significantly improved properties as compared to existing cables.

With the foregoing in mind, FIG. 1 is a schematic diagram of an embodiment of an amusement attraction 10 (e.g., amusement ride) that includes an accessory 12, coupled via a cable 14, to a component 16 of the amusement attraction 10. In the illustrated embodiment, the accessory 12 is an AR/VR headset worn by a guest 18 (e.g., passenger of the amusement attraction 10) and the component 16 is a ride vehicle that carries the guest 18 in the amusement attraction 10 (e.g., along a path). The AR/VR headset enables the guest 18 to view virtual features 20 and/or physical features 22 of the amusement attraction 10. For example, the AR/VR headset may provide an AR experience by displaying the virtual features 20 onto a display (e.g., transparent display; lens) of the AR/VR headset so that the virtual features 20 appear to overlay the physical features 22 viewed through the display (e.g., from a perspective of the guest 18 wearing the AR/VR headset).

In an amusement attraction 10, the cable 14 may be bent, stretched, and/or twisted due to movement of the guest 18, as well as due to motion of the ride vehicle. Additionally, the cable 14 may be bent, stretched, and twisted when the guest 18 puts on and takes off the AR/VR headset. Advantageously, the cable 14 is designed to withstand bending, stretching and/or twisting so that the cable 14 may continue to function properly to provide electronic signals even under such conditions. In turn, this enables the AR/VR headset to continue to function property to provide high quality visual effects even under such conditions. It should be appreciated that the ride vehicle may include multiple cables and multiple AR/VR headsets, such as one cable and its connected AR/VR headsets per seat (e.g., for 2, 3, 4, or more seats) in the ride vehicle.

Figure 2:
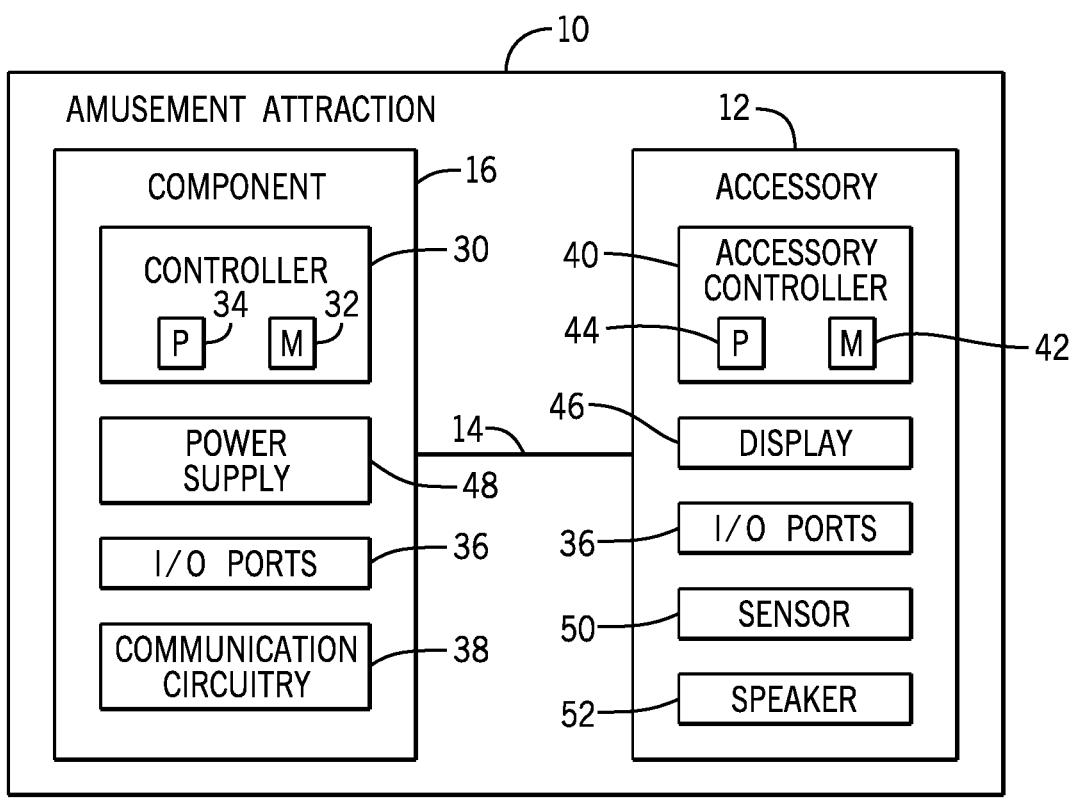
FIG. 2 is a block diagram of the amusement attraction with the cable that connects the accessory and the component of the amusement attraction, in accordance with an embodiment of the present disclosure.

FIG. 2 is a block diagram of an embodiment of the amusement attraction 10 that includes the cable 14 connected to the accessory 12 and the component 16 of the amusement attraction 10. The component 16 of the amusement attraction 10 may operate at least in part via instructions from a controller 30, which may include a memory 32 for storing instructions executable by a processor 34. For example, when the component 16 is a ride vehicle, the controller 30 may control the motor of the ride vehicle to accelerate and/or decelerate the ride vehicle. Similarly, the accessory 12 may operate at least in part via instructions from an accessory controller 40, which may include a memory 42 for storing instructions executable by a processor 44. For example, when the accessory 12 is an AR/VR headset, the accessory controller 40 may provide instructions for the display 46 to display certain virtual features 20 and/or physical features 22 of the amusement attraction 10.

The processors 34 and 44 may include one or more processing devices, and the memory 32 and 42 may include one or more tangible, non-transitory, machine-readable media. By way of example, such machine-readable media can include random access memory (RAM), read-only memory (ROM), erasable programmable read-only memory (EPROM), electrically erasable programmable read-only memory (EEPROM), compact disk read-only memory (CD-ROM), or other optical disk storage, magnetic disk storage or other magnetic storage devices, or any other medium that can be used to carry or store desired program code in the form of machine-executable instructions or data structures and that can be accessed by the processors 34 and 44 or by a special purpose or programmed computer or other machine with a processor.

The component 16 may include communication circuitry 38, such as a receiver and a transmitter, to communicate over wired and/or wireless communication paths with any other components of the amusement attraction 10. The I/O ports 36 are interfaces that may couple to other elements of the amusement attraction 10, such as the accessories 12 (e.g., AR/VR headset; handheld device; wearable device; input devices, such as a joystick or a touch screen; sensors), via the cable 14. I/O ports 36 may include Universal Serial Bus (USB) ports, High Definition Multimedia Interface (HDMI) ports, and the like. The component 16 may include additional components, such as a power supply 48 (e.g., a battery, a solar panel, an electrical generator) and/or a motor, which enable the operation and/or movement of the component 16.

The accessory 12 may include a display 46 (e.g., transparent display) for displaying the virtual features 20 of the amusement attraction 10. In an embodiment, the accessory 12 may include a speaker 52 that may emit sounds corresponding to the virtual features 20 and/or physical features 22 of the amusement attraction 10. In addition, the accessory 12 may include I/O (input/output) ports 36 that may couple, via the cable 14, to the component 16 of the amusement attraction 10. In particular, the cable 14 and the I/O ports 36 may enable transmission of computer-implemented instructions, data, and/or power between the controller 30 of the component 16 and the accessory controller 40 of the accessory 12. For example, the cable 14 may enable the controller 30 to pass instructions for the accessory 12 to display a particular image sequence, which may be dependent on direction and/or speed of the movement of the component 16 (e.g., the ride vehicle). In another example, information from the sensor 50 may be communicated, via the cable 14, to the component 16. The sensor 50 on the accessory 12 may be a camera or a Light Detection and Ranging (LIDAR) sensor, which tracks the direction of the guest's gaze (e.g., for accurate mapping of the virtual features 20 onto the physical features 22 of the amusement attraction 10).

Figure 3:
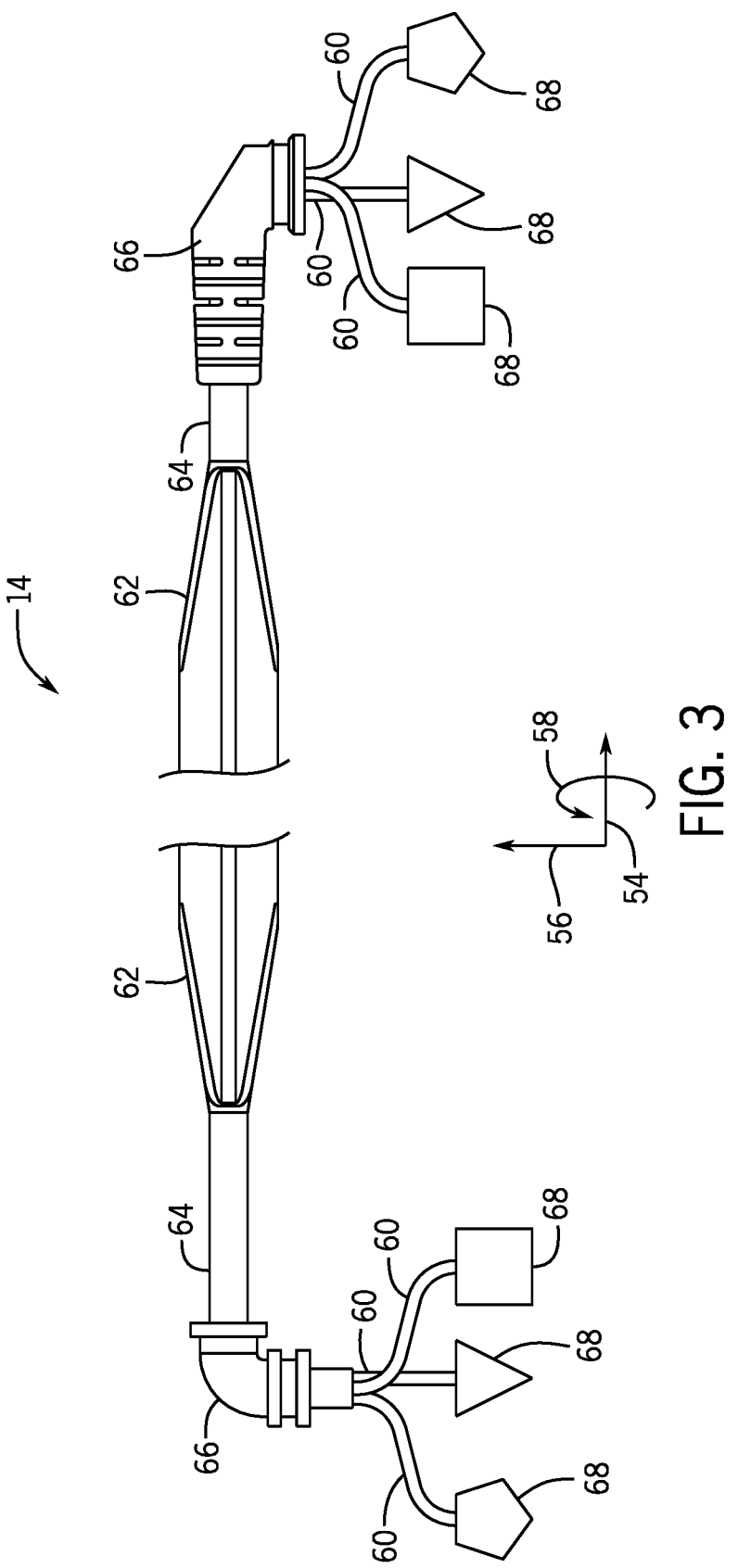
FIG. 3 is a schematic diagram of the cable, in accordance with an embodiment of the present disclosure.

FIG. 3 is a schematic diagram of the cable 14, in accordance with an embodiment of the present disclosure. To facilitate discussion, the cable 14 may be described with reference to an axial axis 54, a radial or a lateral axis 56, and/or a circumferential axis 58. For example, when the cable 14 is held/extended to a straight configuration, as shown, the cable 14 generally extends along the axial axis 54 and has certain features arranged in certain manners with respect to the radial or the lateral axis 56 and/or the circumferential axis 58. In an embodiment, the cable 14 may include several internal cables 60 enclosed in (e.g., wrapped in; circumferentially surrounded by) an outer jacket. For example, the cable 14 may include three different internal cables 60. However, the cable 14 may include fewer or more internal cables 60 (e.g., 1, 2, 4, 5, 6, or more). In an embodiment, the internal cables 60 may include a USB cable, an HDMI cable, and/or a sensor cable (e.g., for a sensor that detects a condition and generates electrical signals indicative of the condition).

The outer jacket of the cable 14 may include heat shrink fabric, which is a material that shrinks due to exposure to heat. The purpose of the outer jacket is to protect the internal cables 60 from excessive twisting, bending, stretching, and/or other types of forces. For example, the outer jacket may protect the internal cables 60 (and conductors inside the internal cables 60) from physical damage that could result, for example, from the cable 14 being brushed along a sharp corner or being stepped on.

In an embodiment, the cable 14 includes a flat portion 62 in a middle region of the cable 14 and round portions 64 near end regions of the cable 14. The flat portion 62 may have an oval or elongated cross-sectional shape (e.g., elongated as compared to the round portions 64), and the round portions 64 may have a circular cross-sectional shape. In the flat portion 62 of the cable 14, the internal cables 60 may be arranged in a row, side by side (e.g., along the lateral axis 56; see FIG. 5). As result of such arrangement of the internal cables 60, the flat portion 62 may bend only in one direction (e.g., vertically). This minimizes a twisting motion of the flat portion 62 and distributes stress across the internal cables 60, such that each internal cable 60 experiences a substantially equal or similar amount of stress during the twisting motion. Therefore, each internal cable 60 acquires a substantially equal or similar amount of wear over time. This may present an advantage over a round cable (e.g., round in a middle region) where any internal cables or wires are arranged in a circle with each internal cable or wire taking up a generally pie-shaped section of the cable cross section (e.g., the internal cables or wires extend along the axial axis 54 of the cable and are distributed circumferentially about the axial axis 54 or a center axis of the cable; see FIG. 4). A round cable may bend in two directions (e.g., vertically and laterally), and bending of the round cable distributes stress unevenly among the internal cables (e.g., one of the internal cables experiences more stress than others). This leads to some internal cables wearing down faster than others. Thus, the flat portion 62 of the cable 14 provides durability and longevity to the cable 14 (e.g., as compared to round cables).

At the flat portion 62 of the cable 14, the heat shrink fabric/the outer jacket forms a flattened envelope. In an embodiment, no heat is applied to the heat shrink fabric of the flat portion 62 of the cable 14. At the round portions 64 of the cable 14, the outer jacket is shrunk using heat to fit snugly around the internal cables 60. In an embodiment, heat is applied to limited or relatively small portions of the cable 14 (e.g., around 6-7 centimeters long at each of the round portions 64; shorter in length along the axial axis 54 as compared to the flat portion 62 of the cable) as the round portion 64 of the cable 14 may be more vulnerable to damage from twisting (e.g., as compared to the flat portion 62 of the cable 14). However, the round portions 64 near the end regions of the cable 14 are beneficial for certain reasons, such as to facilitate or enable attachment of strain relief pieces 66.

In an embodiment, the outer jacket of the cable 14 may include one or more color segments along portions of the length of the cable 14. Each color segment may represent, using a color (e.g., red, blue) or a combination of colors, to indicate a characteristic of the cable 14 at the location of the color segment. For example, the one or more color segments may provide installation guidance, and the color of each color segment may indicate whether and/or how the cable 14 should be tied to a frame of the amusement attraction 10. By way of example, a first color segment (e.g., red color segment) at a first location or along a first length of the cable 14 may indicate that the cable 14 should be tied to the frame using a first type of fastener (e.g., zip tie fastener(s)) at the first location. Additionally, a second color segment (e.g., blue color segment) at a second location or along a second length of the cable 14 may indicate that the cable 14 should be tied to the frame using a second type of fastener (e.g., hook and loop fastener(s)) at the second location. In an embodiment, the color segments may indicate directions in which the cable 14 is configured to bend at certain locations (e.g., a first color segment indicates a first direction, and a second color segment indicates a second direction) and/or flexibility of the cable 14 at certain locations (e.g., a first color segment indicates a relatively flexible portion, and a second color segment indicates a relatively rigid portion). The color segments may be integrated into the cable 14 by sewing colored thread into the outer jacket. Additionally or alternatively, the outer jacket may be painted, dyed, or colored by any suitable coloring techniques. In an embodiment, characteristics of portions of the cable 14 may be indicated by another visual indicator (e.g., text, patterns, shapes) printed and/or integrated into the outer jacket of the cable 14.

In an embodiment, the cable 14 may include the strain relief pieces 66, each positioned near a respective end region of the cable 14. The purpose of the strain relief pieces 66 is to relieve stresses and tensions that could break the conductor inside the internal cables 60 or sever the connection with the connector 68 and the internal cable 60. The strain relief pieces 66 may be have any suitable form, such as right angle strain relief pieces 66. Portions of the internal cables 60 may be exposed (e.g., outer jacket may be removed) on the outer edges of the cable 14 (e.g., between the strain relief pieces 66 and the connectors 68). In an embodiment, the strain relief pieces 66 may be formed, using a mold, over the cable 14 (e.g., overmolded) from a firm yet flexible resin. The strain relief pieces 66 may have grooves for convenient attachment of the accessory 12 to one side of the cable 14 (e.g., first set of connectors 68) and convenient attachment of the component 16 to the another side of the cable 14 (e.g., second set of connectors 68). In one embodiment, when the accessory 12 and the component 16 are attached to the cable 14, the portions of the internal cables 60 may be housed inside the accessory 12 on one side and housed in the component 16 on the other side such that only the strain relief pieces 66 and a central portion of the cable 14 between the strain relief pieces 66 is exposed (e.g., accessible and/or visible to the guest 18 of FIG. 1).

In an embodiment, each of the internal cables 60 may have respective connectors 68 on both ends. In an embodiment, one or more of the connectors 68 of the internal cable may include a repeater to amplify the signal coming from the internal cable 60. In an embodiment, the internal cables 60 may have male connectors 68, female connectors 68, or both types of connectors on either end of the cable 14. One or more connectors 68 on either side of the cable 14 may be a Japan Solderless Terminal (JST) connector. In addition, one or more of the connectors 68 on either side may be different versions of the same type of connector 68. For example, one side of the internal cable 60 may have an HDMI connector and the other side of the internal cable 60 may be a micro HDMI connector.

Figure 4:
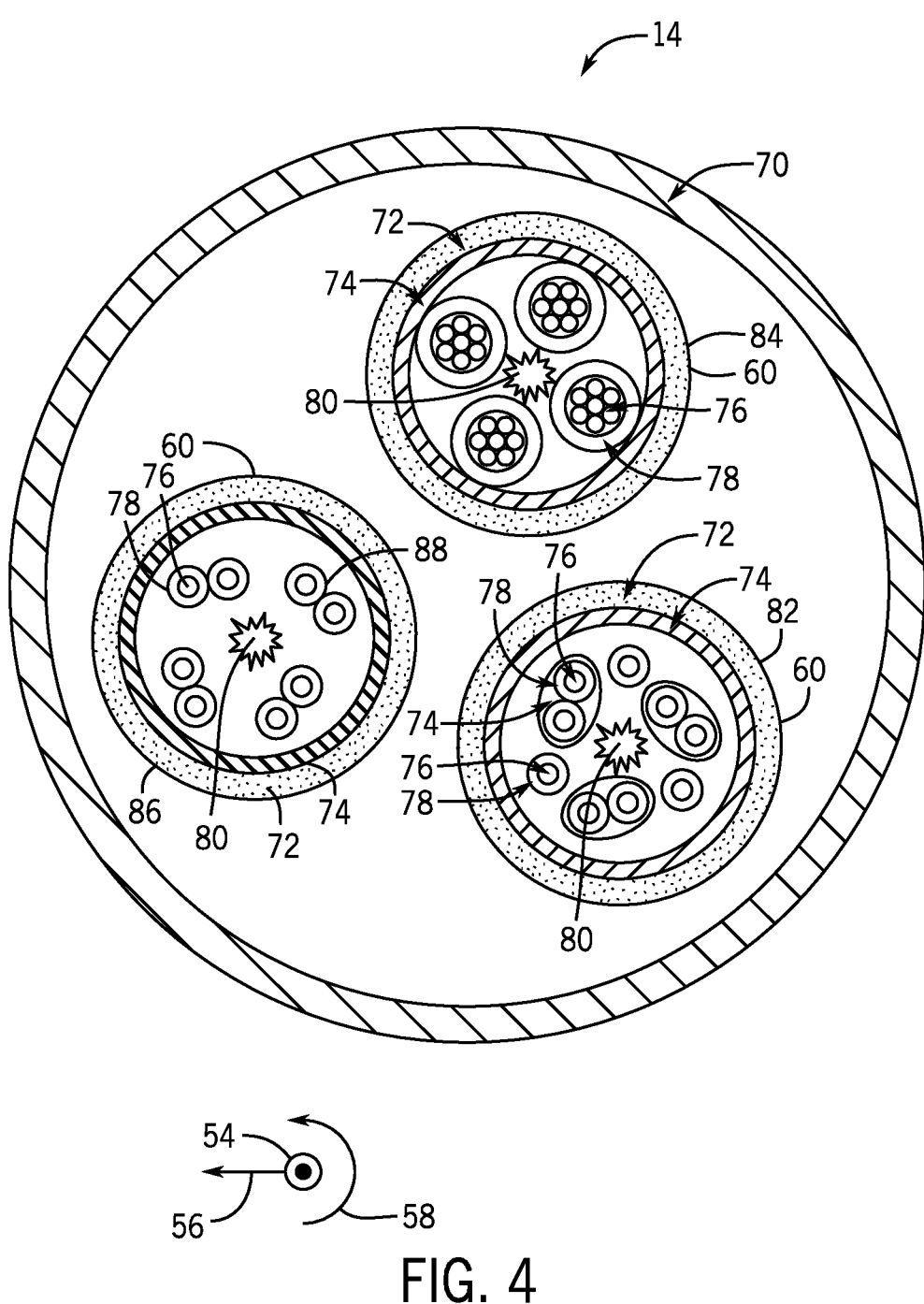
FIG. 4 is a schematic diagram of a cross-section of a round portion of the cable, in accordance with an embodiment of the present disclosure.

FIG. 4 is a schematic diagram of a cross-section of a round portion 64 of the cable 14, in accordance with an embodiment of the present disclosure. The round portion 64 of the cable 14 includes the internal cables 60 arranged in a circle such that each internal cable 60 takes up a generally pie-shaped section of the cable cross section, as shown (e.g., the internal cables 60 extend along the axial axis 54 of the cable 14 and are distributed circumferentially about the axial axis 54 or a center axis of the cable 14). In an embodiment, the cable 14 includes three internal cables 60 with a first internal cable 60, 82 being an HDMI cable, a second internal cable 60, 84 being a USB cable, and a third internal cable 60, 86 being an Ethernet cable. However, the internal cables 60 may be any suitable types of cables used in any suitable combination.

As discussed, the cable 14 includes an outer jacket 70 that may be made of heat shrink fabric. At least one of the internal cables 60 may include an inner jacket 72, which may be made of polyvinyl chloride (PVC), plastic, and/or similar insulative materials. At least one of the internal cables 60 may include shielding 74, which may be made of metal (e.g., Aluminum), such as a braided metal or metal foil, or another conductive material. At least one of the internal cables 60 may include conductors 76 (e.g., bundles of metal wires) surrounded by padding 78, which may be made of PVC, plastic, or other insulative materials. The conductors 76 surrounded by the padding 78 may be referred to herein as "padded conductors 76." In an embodiment, each conductor 76 may include a bundle of wire (e.g., thin-gauge wire) made of copper or other conductive materials. At least one of the internal cables 60 may have multiple conductors 76 padded for transmission of various electrical signals.

At least one of the internal cables 60 may include filler 80 that is placed between the padded conductors 76. In an embodiment, the filler 80 may include nylon strands that minimize friction between the padded conductors 76, thereby allowing the padded conductors 76 to slide past each other as the internal cable 60 is bent. It may be appreciated that the internal cables 60 may include additional components and/or alternative materials not mentioned above.

As shown, the first internal cable 60, 82 may be a USB cable or other type of cable with multiple padded conductors 76 (e.g., four padded conductors 76). In an embodiment, one of the internal cables 60 is an HDMI cable or other type of cable with multiple padded conductors 76 (e.g., six padded conductors 76), with at least some of the multiple padded conductors 76 having an additional layer of shielding 74. It may be appreciated that the filler 80 made of nylon strands may be positioned between and/or wrapped around all of the padded and/or shielded conductors 76 enabling the padded and/or shielded conductors 76 to twist and slide past one another, and distributing the force that may otherwise break the wires. For example, the filler 80 may circumferentially surround at least some of or all of the padded and/or shielded conductors 76 and/or may be positioned in a center region between the padded and/or shield conductors 76.

As shown, the third internal cable 60, 86 includes padded conductors 76 twisted in pairs to form unshielded twisted pairs 88 (e.g., four unshielded twisted pairs 88). The unshielded twisted pairs 88 may reduce the effect of noise currents induced on the third internal cable 60, 86 by electric or magnetic fields. For example, an interference source (e.g., an electromagnetic field) may affect currents in two padded conductors 76 of an unshielded twisted pair 88. Because the two padded conductors 76 are twisted together, the interference source may affect the two padded conductors 76 equally, producing noise as a common-mode signal, which can be eliminated by a receiver. The third internal cable 86 further includes the filler 80 to reduce friction between the unshielded twisted pairs.

It should be appreciated that the cable 14 may include any variations and combinations of the internal cables 60. For example, another internal cable 60 may include a greater number (e.g., 5, 10, 20) of conductors 76 with or without the padding 78, as well as the filler 80 packed throughout the cross section of the internal cable 60. Additionally, other embodiments of the cable 14 may include any number of internal cables 60 (e.g., 1, 2, 3, 4, 5, 6, 7, 8, 9, 10, or more).

Figure 5:
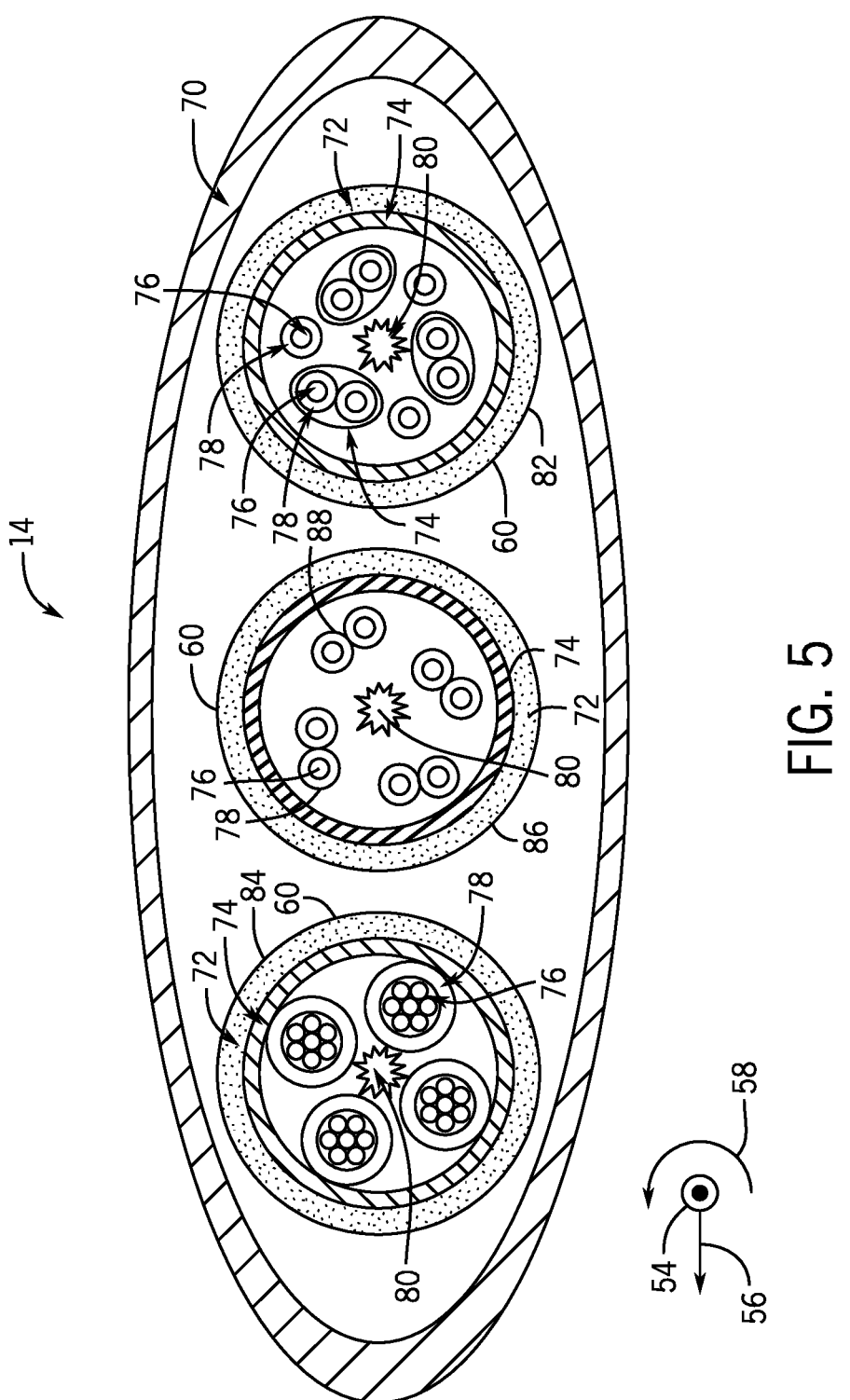
FIG. 5 is a schematic diagram of a cross-section of a flat portion of the cable, in accordance with an embodiment of the present disclosure.

FIG. 5 is a schematic diagram of a cross-section of the flat portion 62 of the cable 14, in accordance with an embodiment of the present disclosure. In the flat portion 62 of the cable 14, the internal cables 60 are arranged in a row, side by side, as shown.

As discussed, the cable 14 includes the outer jacket 70 that may be made of heat shrink fabric. At least one of the internal cables 60 may include the inner jacket 72, which may be made of PVC, plastic, and/or other insulative materials. At least one of the internal cables 60 may include the shielding 74, which may be made of metal (e.g., Aluminum), such as a braided metal or metal foil, or another conductive material. At least one of the internal cables 60 may include the conductors 76 surrounded by the padding 78 made of PVC, plastic, or other insulative materials. In an embodiment, each conductor 76 may include a bundle of wire (e.g., thin-gauge wire) made of copper or other conductive materials. At least one of the internal cables 60 may have multiple conductors 76 padded for transmission of various electrical signals. At least one of the internal cables 60 may include the filler 80 that is placed between the padded conductors 76. In an embodiment, the filler 80 may include nylon strands that minimize friction between the padded conductors 76 allowing the padded conductors 76 to slide past each other when the internal cable 60 is bent. It may be appreciated that the internal cables 60 may include additional components and/or alternative materials not mentioned above.

Figure 6:
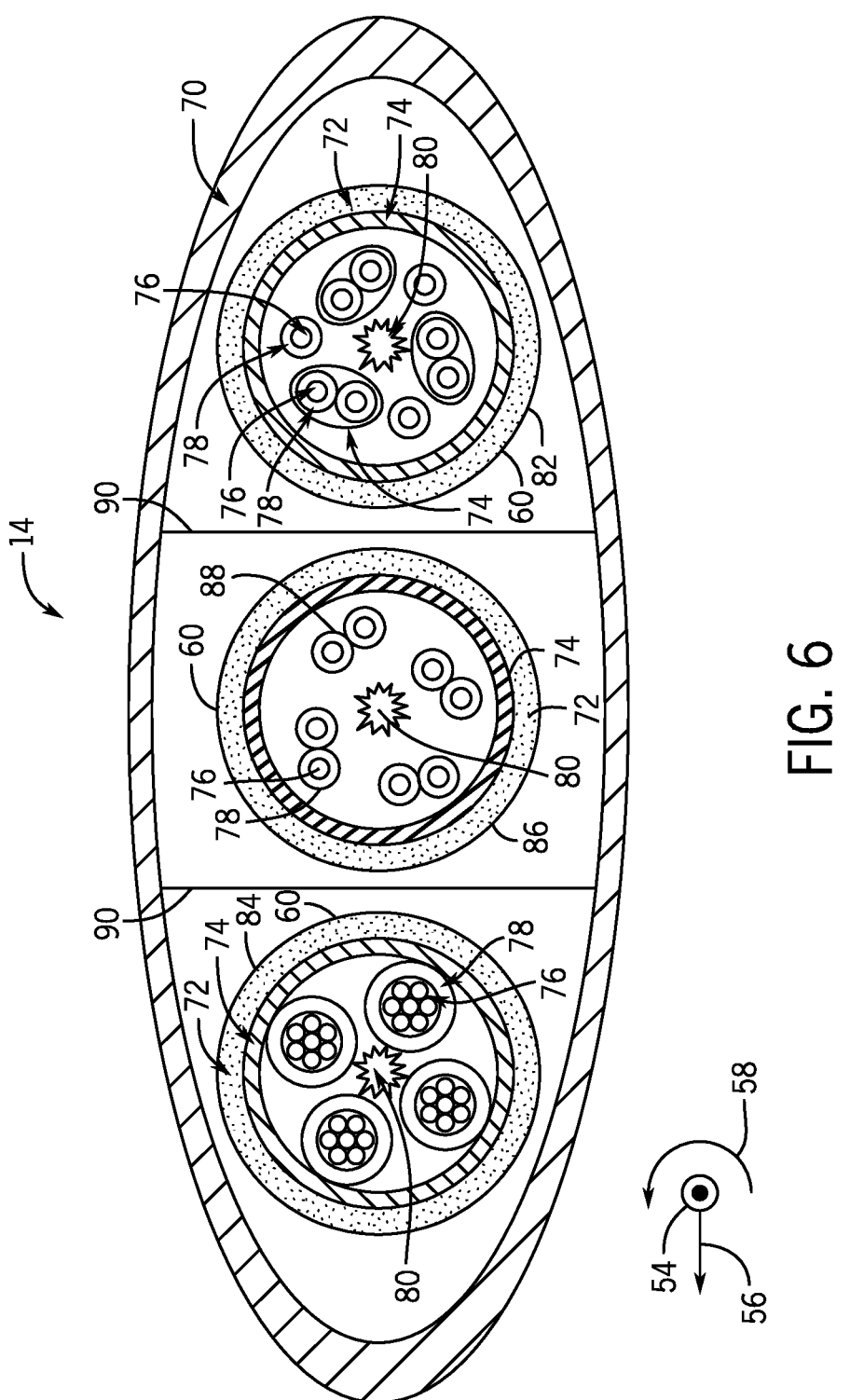
FIG. 6 is a schematic diagram of a cross-section of the flat portion of the cable with internal dividers, in accordance with an embodiment of the present disclosure.

FIG. 6 is a schematic diagram of the flat portion 62 of the cable 14, in accordance with an embodiment of the present disclosure. The cable 14 may include dividers 90 that separate the internal cables 60 along at least a portion of the length of the cable 14. For example, the dividers 90 may restrain or block the internal cables 60 from tangling or twisting about one another to thereby improve cable management. In an embodiment, the dividers 90 may be formed from thread sewn between the internal cables 60 through the outer jacket 70. Alternatively, the dividers 90 may be fixed pieces or structures inserted in the cable 14 between the internal cables 60.

In an embodiment, the dividers 90 may be present in select sections of the cable 14, such as sections expected to experience high levels of strain or torsion. That is, some cross sections taken at certain locations along the length of the cable 14 may appear as FIG. 5, while other cross sections taken at other locations along the length of the cable 14 may look like FIG. 6. Additionally, the dividers 90 may be formed from materials ranging in rigidity, and thus, may increase or decrease the rigidity of the cable 14 at certain locations. For example, the dividers 90 may stiffen the cable 90 where the cable is configured to attach to the frame of the amusement attraction 10. In some embodiments, varying the material, placement, and/or arrangement of the dividers 90, may provide controlled flexure of the cable 14. Furthermore, the thread used to create the dividers 90 may be colored and externally visible along the outer jacket 70, such that the thread provides the color segments indicating characteristics (e.g., flexure characteristics) of the cable 14, as discussed above in reference to FIG. 3.

Figure 7:
FIG. 7 is a side view of a headset to which the cable is pivotally coupled at a cable interface, in accordance with an embodiment of the present disclosure.

FIG. 7 is a side view of a headset 100 (i.e., the accessory 12) coupled to the cable 14, in accordance with an embodiment of the present disclosure. The headset 100 may be an AR/VR headset worn by the guest 18, enabling the guest 18 to view the virtual features and/or the physical features 22 of the amusement attraction 10. The headset 100 may include a display 102 on which the virtual features 20 may be displayed. Additionally, the headset 100 may include a housing 104 forming an exterior structure of the headset 100 and containing internal parts of the headset 100. An end (e.g., end portion) of the cable 14 may couple to the headset 100 via a cable interface 106 of the headset 100. The cable interface 106 may receive the end of the cable 14, securely attach to the end of the cable 14, and feed the internal cables 60 through the housing 104 into receivers (e.g., mating components) housed within the headset 100.

In some embodiments, the cable interface 106 may enable the end of the cable 14 to swivel (e.g., rotate) with respect to the headset 100. In this way, stress on the cable 14 may be reduced as the orientation of the headset 100 dynamically changes with respect to the component 16 of the amusement attraction 10. For example, as the guest 18 turns their head to view the physical features 22, the end of the cable 14 may swivel at the cable interface 106 to reduce bending of the cable 14. As shown, the cable interface 106 may include a keyhole opening 108 in the housing 104 through which the end of the cable 14 may insert, clip, or otherwise engage with the headset 100. The keyhole opening 108 may include a round portion 110 which defines a passage for the end of the cable 14 into the headset 100. The internal cables 60 may feed through the passage of the round portion 110 and connect to the receivers inside the headset 100. The keyhole opening 108 may also include a cable outlet portion 112 extending from the round portion 110. The cable outlet portion 112 defines a space through which the cable 14 extends out of the cable interface 106 transversely (e.g., perpendicularly) to the insertion of the end of the cable 14 into the round portion 110. In other words, the end of the cable 14 may insert into the headset 100 in a first direction (e.g., along the lateral axis 56) via the round portion 110, and the cable 14 may extend out from the headset 100 in a second direction (e.g., along the axial axis 54) transversely to the first direction via the cable outlet portion 112. Additionally, the cable outlet portion 112 may include tapered walls that extend from the round portion 110 to provide a range of angular clearance for the cable 14 (e.g., a limited range of motion; about 15 degrees, 30 degrees, 45 degrees, 90 degrees, or 120 degrees; between 15 to 120 degrees, 30 to 90 degrees, or 15 to 45 degrees; less than 360 degrees, 180 degrees, 90 degrees, or 45 degrees). That is, the cable 14 may be plugged into the cable interface 106 and extend therefrom within the range of angular clearance. In the illustrated embodiment, the cable outlet portion 112 includes the tapered walls slanting outward and downward from the round portion 110 to form an angular sector accommodating movement of the cable 14 and also blocking or limiting movement of the cable 14 outside of the cable outlet portion 112 to thereby provide the limited range of motion (e.g., reduce bending of the cable 14 by enabling the movement of the cable 14 within the cable outlet portion 112, but also reduce twisting or wear at the cable interface 106 by limiting the movement of the cable 14 to within the cable outlet portion 112). In this way, the cable 14 may swivel as indicated by arrows 114 within the cable outlet portion 112 while the end of the cable 14 is plugged into the round portion 110 of the cable interface 106. In an embodiment, other elements of the cable interface 106 may rotate in addition to the end of the cable 14. For example the receivers within the headset may rotate with the end of the cable 14 to further enable limited swivel of the cable 14.

The cable interface 106 may be reproduced (e.g., mirrored) on the opposite lateral side of the headset 100 (i.e., the right side, relative to the user). That is, the headset 100 may include two cable interfaces 106, either of which may receive the cable 14. In this way, the cable 14 may be attached on either side of the headset 100, reducing hindrance caused by the cable 14 extending laterally across the body of the guest 18 to attach to the headset 100. For example, in a ride vehicle, the guest 18 on a left side of the ride vehicle may connect their respective cable 14 to a left lateral side of their respective headset 100, and another guest on a right side of the ride vehicle may connect their respective cable 14 to a right lateral side of their respective headset 100. In this way, the cables 14 may be positioned proximate to outer edges of the ride vehicle and away from adjacent guests, as well as accessible to ride operators for maintenance and inspection. As another example, in a ride vehicle, the guest 18 on the left side of the ride vehicle may connect their respective cable 14 to the right lateral side of their respective headset 100, and another guest on the right side of the ride vehicle may connect their respective cable 14 to the left lateral side of their respective headset 100. In this way, the cables 14 may be positioned proximate to an interior of the ride vehicle and away from outer edges of the ride vehicle, which may protect the cables 14 from contact with objects outside of the ride vehicle. In an embodiment, the guest 18 may select whether to connect the cable 14 to the left lateral side or the right lateral side of their respective headset 100 based on preference (e.g., a right handed guest may choose to connect to the right lateral side).

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, while the cable is disclosed as being used in the context of an amusement park and/or an attraction, it should be appreciated that the cable may be used in any of a variety of other context to communicatively couple components to one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cable comprising:
a plurality of internal cables configured to transmit electrical signals;
an outer jacket configured to house the plurality of internal cables;
one or more dividers within the outer jacket, wherein the one or more dividers are configured to separate a first internal cable of the plurality of internal cables from a second internal cable of the plurality of internal cables;
round portions formed proximate to opposite end regions of the cable, wherein the plurality of internal cables are arranged to circumferentially surround a center axis in the round portions; and
a flat portion positioned between the round portions of the cable, wherein the plurality of internal cables are arranged in a row across the flat portion.

2. The cable of claim 1, comprising strain relief pieces positioned over the round portions of the cable.

3. The cable of claim 1, wherein the plurality of internal cables comprise a Universal Serial Bus (USB) cable, a sensor cable, a High Definition Multimedia Interface (HDMI) cable, and Ethernet cable, or any combination thereof.

4. The cable of claim 1, wherein the plurality of internal cables comprises male connectors, female connectors, or any combination thereof.

5. The cable of claim 1, wherein the plurality of internal cables comprises one or more connectors comprising a repeater.

6. The cable of claim 1, wherein the outer jacket comprises heat shrink fabric.

7. The cable of claim 1, wherein the round portions of the cable comprise heat shrink fabric that is in a shrunk configuration, via an application of heat, to fit tightly around the plurality of internal cables.

8. The cable of claim 1, wherein the flat portion of the cable comprises an elongated cross-sectional shape.

9. The cable of claim 1, wherein the one or more dividers are present along a portion of a length of the cable, and the one or more dividers are not present along another portion of the length of the cable.

10. A system for an amusement attraction, the system comprising:
an accessory configured to be worn or held by a guest; and
a cable configured to connect the accessory to a component, wherein the cable comprises:
a plurality of internal cables configured to transmit electrical signals;
an outer jacket configured to house the plurality of internal cables;
round portions formed proximate to opposite end regions of the cable, wherein the plurality of internal cables are arranged to circumferentially surround a center axis in the round portions; and
a flat portion positioned between the round portions of the cable, wherein the plurality of internal cables are arranged in a row across the flat portion.

11. The system of claim 10, wherein the accessory is an augmented reality/virtual reality headset, and the component is a ride vehicle configured to carry the guest within the amusement attraction.

12. The system of claim 10, comprising a memory storing instructions and a processor configured to execute the instructions, wherein the cable is configured to transmit the instructions from the component to the accessory.

13. The system of the claim 12, wherein the instructions are configured to cause a display of the accessory to display virtual features for visualization by the guest.

14. A cable comprising:
an outer jacket comprising heat shrink fabric; and
one or more internal cables, comprising:
one or more conductors;
padding surrounding the one or more conductors to form one or more padded conductors;
shielding surrounding the one or more padded conductors;
filler wrapped around the one or more padded conductors; and
an inner jacket surrounding the one or more padded conductors, the shield, and the filler, wherein the inner jacket comprises plastic, polyvinyl chloride (PVC), another insulative material, or any combination thereof.

15. The cable of claim 14, wherein the one or more internal cables comprise a Universal Serial Bus (USB) cable, a sensor cable, a High Definition Multimedia Interface (HDMI) cable, or any combination thereof.

16. The cable of claim 14, wherein the cable comprises a round portion and a flat portion.

17. The cable of claim 16, wherein the cable comprises an additional round portion and the flat portion is positioned between the round portion and the additional round portion.

18. The cable of claim 14, wherein the padding comprises plastic, PVC, another insulative material, or any combination thereof.

19. The cable of claim 14, wherein the shielding comprises metal foil, braided metal, another conductive material, or any combination thereof.

20. The cable of claim 14, wherein the filler comprises nylon strands.

* * * * *